United States Patent
Seelert et al.

[11] Patent Number: 6,141,369
[45] Date of Patent: *Oct. 31, 2000

[54] LOW-NOISE FREQUENCY-MULTIPLIED LASER

[75] Inventors: Wolf Seelert; Vasiliy Ostroumov, both of Lubeck, Germany

[73] Assignee: Coherent, Inc., Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/145,705

[22] Filed: Sep. 2, 1998

[30]  Foreign Application Priority Data

Jul. 29, 1998 [DE] Germany ............... 198 34 202

[51] Int. Cl.$^7$ .................................................. H01S 3/082
[52] U.S. Cl. ............... 372/97; 372/22; 372/27; 372/92; 372/108; 372/98
[58] Field of Search ................ 372/22, 19, 27, 372/92, 97, 108, 98

[56]  References Cited

U.S. PATENT DOCUMENTS

| | | | |
|---|---|---|---|
| 4,441,186 | 4/1984 | Erickson | 372/98 |
| 4,933,945 | 6/1990 | Blumentritt et al. | 372/22 |
| 5,052,815 | 10/1991 | Nightingale et al. | 372/94 |
| 5,130,997 | 7/1992 | Ortiz et al. | 372/21 |
| 5,430,754 | 7/1995 | Suzuki et al. | 372/92 |
| 5,627,849 | 5/1997 | Baer | 372/92 |
| 5,761,227 | 6/1998 | Hargis et al. | 372/22 |
| 5,825,798 | 10/1998 | Momiuchi et al. | 372/22 |
| 5,862,164 | 1/1999 | Hill | 372/27 |
| 5,917,844 | 6/1999 | Hill | 372/22 |

FOREIGN PATENT DOCUMENTS

| | | | |
|---|---|---|---|
| 0 587 330 | 3/1994 | European Pat. Off. | H01S 3/109 |
| 3-150887 | 6/1991 | Japan | H01S 3/109 |

OTHER PUBLICATIONS

M. Tsunekane, et al., "Elimination of chaos in a multilongitudinal–mode, diode–pumped, 6–W continuous–wave, intracavity–doubled Nd:YAG laser," *Optics Letters*, vol. 22, No. 13, Jul. 1, 1997, pp. 1000–1002.

T. Baer, "Large–amplitude fluctuations due to longitudinal mode coupling in diode–pumped intracavity–doubled Nd:YAG laser," *Journal of the Optical Society of America B (Optical Physics)*, vol. 3, No. 9, Sep. 1986, pp. 1175–1180.

T. Kellner, F. Heine & G. Huber, "Efficient laser performance of Nd:YAG at 946 nm and intracavity frequency dougling with LiJO$_3$, β–BaB$_2$O$_4$, and LiB$_3$O$_5$," *Applied Physics B*, vol. 65, No. 6, Dec. 1977, pp. 789–792.

*Primary Examiner*—Leon Scott, Jr.
*Attorney, Agent, or Firm*—Limbach & Limbach L.L.P.

[57]  ABSTRACT

An intracavity frequency-doubled laser has a standing-wave resonator including a gain medium and an optically-nonlinear crystal. The optically-nonlinear crystal has a large walkoff-angle between the fundamental laser-beam and the frequency-doubled beam created by passage of the fundamental laser-beam through the crystal. The optically-nonlinear crystal is arranged such that the walkoff-angle provides for lateral, spatial separation of a fundamental and a corresponding frequency-doubled beam outside the crystal, and for separation of counterpropagating frequency-doubled beams from each other. The spatial separation of the counterpropagating frequency-doubled beams reduces amplitude fluctuation caused by interference between the beams. A physical stop is used to prevent one of the frequency-doubled beams from entering the gain medium. This prevents that beam from spuriously pumping the gain medium and thus serves to further reduce amplitude fluctuation.

21 Claims, 3 Drawing Sheets

LOW-NOISE FREQUENCY-MULTIPLIED LASER

TECHNICAL FIELD OF THE INVENTION

The invention relates generally to frequency-multiplied lasers. It relates in particular to intracavity frequency-multiplied lasers.

DISCUSSION OF BACKGROUND ART

An intracavity frequency-doubled laser generally comprises a pump-light source, first and second mirrors forming a laser resonator, a gain-medium for providing a primary laser-beam at a fundamental wavelength, and an optically-nonlinear crystal. The first mirror, gain-medium, optically-nonlinear crystal and second mirror are arranged on a longitudinal axis of the laser resonator. The second mirror may serve as an outcoupling-mirror for the resonator. Interaction of the primary laser-beam with the optically-nonlinear crystal creates a second laser-beam (referred to hereinafter aa a frequency-multiplied beam) having two or more times the frequency the primary laser-beam. By way of example, such an interaction can create green light from infrared light.

In one conventional laser of this type, the primary laser-beam comprises between about five to twenty longitudinal modes. These longitudinal modes are very closely-spaced oscillation-frequencies of the laser. Inclusion of an optically-nonlinear crystal within the laser resonator leads to strong fluctuation of the amplitude of the resulting frequency-multiplied beam, for example, with up to one-hundred percent (100%) modulation depth.

This amplitude fluctuation, which can be simply described as noise, has four primary sources. A first of these sources is interaction between frequency-multiplied laser-light created by the primary laser-beam travelling in one direction with frequency-multiplied light created by the primary laser-beam travelling in the opposite direction, after reflection from the outcoupling mirror. This interaction leads to interference and standing waves, and is referred to hereinafter as the "first noise-source".

A second of these interaction or noise-sources arises from interaction between the primary laser-beam with a portion of the frequency-multiplied beam which, in passage through the optically-nonlinear crystal, is reconverted to laser light of the fundamental wavelength. This interaction can significantly influence operation of the laser at the primary oscillation-frequency (about which the mode oscillation-frequencies are closely grouped) leading to chaotic fluctuations. This noise-source, hereinafter defined as the "second noise-source", is discussed in a paper "Elimination of chaos in a multilongitudinal-mode, diode-pumped, 6W intracavity doubled Nd:YAG laser", M. Tsunekane et al., Opt Lett, Vol. 22, No. 13 (July 1997).

The outcoupling mirror is less than one-hundred percent transparent for, i.e., reflects some portion of, the frequency-multiplied beam. That portion of the frequency-multiplied beam which is reflected by the outcoupling mirror can interfere with the original frequency-multiplied beam, thereby contributing to noise in the laser. This is the "third noise-source".

In the optically-nonlinear crystal, different longitudinal modes come into interaction with each other through sum and difference frequency formation. This can effect chaotic power fluctuation. In a linearly-configured laser with standing waves (standing-wave oscillator) this effect is further supported by so-called "spatial holes", i.e., residual amplification in the active gain-medium which remains at the nodes of corresponding oscillation modes. This effect is discussed in a paper "Large amplitude fluctuations due to longitudinal mode coupling in diode pumped intracavity doubled Nd:YAG lasers", T. Baer, J. Opt. Soc. Am. B, Vol. 3, No. 9 1175-1180 (Sept 1986). The effect is described hereinafter as the "fourth noise-source", and can be reduced by a suitable mode distribution as disclosed in U.S. Pat. No. 5,627,849.

To avoid or minimize this fourth noise-source, a single-mode (single-frequency) ring-laser oscillator configuration can be selected, or a standing-wave oscillator with an intracavity, frequency-selective element, such as an etalon, can be selected, thereby excluding nonlinear coupling of longitudinal modes. Such a ring-laser configuration is described in U.S. Pat. No. 5,052,815. Alternatively, the noise can be distributed over very many longitudinal modes, for example, about one-hundred, so that the modulation depth of the noise is less distinct. For this purpose, a laser with a very long resonator must be used.

Formerly, the above-discussed four noise-sources have been only isolated, that is, in part, not even considered, and measures for minimizing the noise have been confined primarily to the fourth noise-source. Further, the known solutions for the problem have the disadvantage, as discussed above, that a particular laser-configuration is necessary, for example, a ring-laser; that supplementary optical elements are necessary; or that the resonator must be made very long, requiring costly temperature stabilization arrangements. Accordingly, there is a need for a solution to the problem of providing an intracavity frequency-multiplied laser with strongly-reduced noise which does not require that the laser be driven in a single mode, many longitudinal modes, or with any particular mode-distribution.

SUMMARY OF THE INVENTION

In one aspect of the present invention, a solution to the above-discussed problem is provided by a laser comprising a pump-light source, first and second mirrors defining a laser resonator having an optical axis, a gain-medium for providing a primary laser-beam at a fundamental wavelength, and an optically-nonlinear crystal. The first mirror, the gain-medium, the optically-nonlinear crystal and the second mirror are arranged on the longitudinal axis of the laser resonator. The optically-nonlinear crystal causes the primary laser-beam to generate a frequency-multiplied laser-beam. The second mirror serves as an outcoupling-mirror for the resonator. The optically-nonlinear crystal is arranged to cause lateral separation of the frequency-multiplied laser-beam from the primary laser-beam.

Spatial separation of the frequency-multiplied laser-beam from the primary laser-beam, here, means that the midpoints of the cross-sections of the primary and frequency-multiplied laser-beams are clearly separated from each other, such that the two cross-sections only partially overlap, or do not overlap at all. Interaction between the beams can only take place in any overlapping region, such that above-described interaction effects are avoided, or at least strongly decreased. A clear improvement of the stability of the laser results when the mid-points of the two beams are separated by about 25% of the diameter of the primary laser-beam. Very good stability is achieved with 50% or greater separation.

In one embodiment of a laser in accordance with the present invention, lateral, spatial separation of beams can be effected by a so-called walk-off effect in the optically-nonlinear crystal; in a supplementary optical element through a dispersion effect; or by a combination of the walk-off and dispersion effects. Different rotation of the polarization orientation of the primary laser-beam and the frequency-multiplied beam is accomplished by a special polarization rotator located between the optically-nonlinear crystal and the outcoupling mirror.

Using the walk-off effect, the impact of the first and second noise-sources can be greatly decreased. Dispersion and/or differential rotation of the polarization orientation of the primary laser-beam and the frequency-multiplied beam can greatly decrease the impact of the third noise-source.

To assist in understanding principles of the present invention, a description of the function of an optically-nonlinear crystal in creating a frequency-multiplied beam, and the walk-off effect are set forth briefly below.

For frequency-multiplication of laser light, so-called optically-nonlinear crystals are employed. these are crystals in which nonlinear optical effects are strongly dominant. If such a crystal is irradiated with a light-wave having a frequency $f_1$ (the primary laser-beam), an optically-nonlinear portion of the resulting polarization in the crystal oscillates at a doubled frequency $f_2(=2f_1)$. A light-wave having this frequency $2f_1$, the second harmonic (frequency-multiplied beam), radiates out of the crystal. In order to achieve maximum intensity of the second harmonic in the direction of the irradiating light-wave, the primary laser-beam and the second harmonic must remain in phase as they pass through the crystal. For such "phase-matching" of the two beams, the refractive index of the crystal for each must be the same. This can be achieved with the help of double refraction.

The beams radiating out of the optically-nonlinear crystal (the primary laser-beam and the second harmonic) can be directed into a second optically-nonlinear crystal. In this second optically-nonlinear crystal, for example, the tripled frequency (third harmonic) of the primary laser-beam is additionally created by mixing the primary laser-beam with the second harmonic. In a further optically-nonlinear crystal, by mixing the fundamental frequency (primary laser-beam) and the third harmonic, the quadrupled frequency can also be created.

For frequency-multiplication, two types of crystal are used, type-I crystals and type-II crystals. These differ from each other in the type of phase-matching.

In a uniaxial optical crystal, the refractive index $n_o$ for the ordinary ray has a different value from the refractive index ne of the extraordinary ray. The ordinary ray is defined as light which is polarized perpendicular to the primary crystal-plane (primary cleavage-plane), while the extraordinary ray is polarized parallel to the primary crystal-plane. The primary crystal-plane is defined by the incidence angle of the light-ray and the optical axis of the crystal.

The primary laser-beam and the second harmonic are polarized perpendicular to each other. If the polarization orientation of the primary laser-beam, for example, is aligned perpendicular to the primary crystal-plane, the primary laser-beam traverses the crystal as the ordinary ray and the second harmonic represents the extraordinary ray. The refractive index $n_{1,o}$ for the primary laser-beam has the same value for all propagation directions in the crystal. Contrary to that, the refractive index $n_{2,e}$ for the second harmonic is dependent on the propagation angle. If, in a coordinate system x,y,z, in which the z axis is aligned with the optical axis of the crystal, the values of the refractive indices for all propagation angles are plotted, the result for the ordinary ray would be a spherical surface and for the extraordinary ray would be an ellipsoid of rotation, both symmetrical about the origin of the coordinate system. For suitable values of $n_{1,o}$ and $n_{2,e}$ the surfaces reduce to two circular lines. On these lines, both refractive indices are the same and phase-matching exists.

If a light ray is directed into an optically-nonlinear crystal as a primary laser-beam, in traversing the crystal, the thus-created frequency-multiplied beam is increasingly laterally displaced, in the primary crystal-plane, from the path of the primary laser-beam. This is the so-called "walk-off effect", and is very distinct and different, dependent on the crystal material. It is quantified by a "walk-off angle", i.e., the angle between the primary laser-beam and the frequency-multiplied beam. The walk-off effect also results in the cross-section of the frequency-multiplied beam, being elliptically distorted on exiting the crystal, with the major axis of the ellipse lying in the primary plane of the crystal. On exiting the optically-nonlinear crystal, the frequency-multiplied beam experiences a refraction which redirects it parallel to the primary laser-beam.

The angular divergence of the primary laser-beam and the frequency-multiplied beam, and the spatial separation of the two beams, lessens the effectiveness of frequency-multiplication. For this reason, in prior-art lasers, material with the smallest possible walk-off angle has been selected for the crystal, and/or, the length of the crystal has been optimized for highest possible frequency-multiplication effectiveness.

In one preferred embodiment of the present invention, exactly the opposite approach is taken, and a crystal with a suitably large walk-off angle is selected. Because of this, a wide spatial separation of the primary laser-beam from the frequency-multiplied beam, and of the oppositely propagating frequency-multiplied beams, is achieved. The effectiveness of frequency-multiplication is optimized via the length of the optically-nonlinear crystal. Preferred materials for the optically-nonlinear crystal are materials in the group consisting of potassium niobate ($KNbO_3$), lithium niobate ($LiNbO_3$), beta barium borate (BBO) and lithium borate (LBO). The use of other materials having a suitably large walk-off angle, however, is not precluded. Spatial separation of the beams is achieved in that the radiation direction of the primary laser-beam diverges, from that of the frequency-multiplied beam, within the optically-nonlinear crystal, by the walk-off angle. The lateral displacement of the mid-points of the two beams increases with increasing length of the optically-nonlinear crystal.

As discussed above, the primary laser-beam which is reflected from the outcoupling mirror, on passage through the optically-nonlinear crystal, creates a second frequency-multiplied beam propagating in an opposite direction to the first frequency-multiplied beam. In the absence of the walk-off effect, the these two frequency-multiplied beams would completely overlap and interact with each other. The result would be interferences, standing waves, and miscellaneous other undesired effects which contribute to laser noise (first and second noise-sources). The walk-off effect causes the frequency-multiplied beam propagating in one direction to be laterally displaced from the primary laser-beam in one direction. The oppositely-propagating frequency-multiplied beam is laterally displaced from the primary laser-beam in an opposite direction. Because of this, the two frequency-multiplied beams are spatially separated from each other and from the primary laser-beam, and can no longer interact with each other. Accordingly, the impact of the first and second noise-sources is avoided, or at least sharply reduced.

In the optically non-linear crystal, loss of phase relationship, due to crystal imperfections, can result in a loss of phase-relationship and corresponding reconversion of the frequency-multiplied beam. So, for example, frequency-multiplied light of frequency 2ν is transformed into its original frequency components ν+ν. Through spatial separation of the beams, interaction of the reconverted light with the primary laser-beam is sharply reduced, thereby strongly reducing the impact of this noise-source.

In another embodiment of the present invention, a supplementary optical element, in the form of a prism or wedge, located in the resonator between the optically-nonlinear crystal and the outcoupling mirror, is used as a separator. This embodiment reduces the impact of the third noise-source. This separator effects, by dispersion, spatial separation of the primary laser-beam from that portion of the frequency-multiplied beam reflected from the outcoupling mirror. As the wavelength of the primary laser-beam and the frequency-multiplied beam differ by at least a factor-of-two, an effective separation of the two beams through dispersion is possible. In order to effect dispersion, the entrance-surface and/or the exit-surface of the separator must be at a non-normal incidence angle to both beams. An optimum incidence angle is that angle at which dispersion is greatest. The outcoupling mirror is arranged such that the primary laser-beam is reflected back along its incidence path, i.e., back on itself. Because of this, the frequency-multiplied beam is not reflected back on itself, thereby avoiding interaction of the primary laser-beam with light reconverted to the fundamental wavelength from the portion of the frequency-multiplied beam reflected from the outcoupling mirror. For the same reason, interference of the frequency-multiplied beam with the portion thereof reflected from the outcoupling mirror is avoided.

Spatial separation of the two beams can also be achieved by the combined effects of walk-off effect and dispersion. For this purpose, in addition to an optically-nonlinear crystal providing spatial separation of the beams via the walk-off effect, a dispersion-causing element is arranged in the resonator, as described above.

In yet another embodiment of a laser in accordance with the present invention, a polarizer or polarization rotator, alone or in combination with another supplementary component, can be used as a separator. This embodiment also reduces the impact of the third noise-source.

The polarization rotator is effective for the primary laser-beam as a half-wave or full-wave phase-retarder (λ/2-plate or λ-plate), and is effective for the frequency-multiplied beam, ideally, as a quarter-wave phase-retarder. The primary laser-beam reflected from the outcoupling mirror, on again reaching the optically-nonlinear crystal, has traversed the polarizer twice and lies in its original polarization orientation. The frequency-multiplied beam, on the contrary, on twice traversing a polarizer arranged as a quarter-wave plate therefor, has its polarization orientation rotated by 90°. Because of this, it is neither possible for the frequency-multiplied beam to create the fundamental wavelength by reconversion in the optically-nonlinear crystal, nor possible to interfere with the oppositely propagating frequency-multiplied beam.

As discussed above, the primary laser-beam reflected from the outcoupling mirror, on traversing the optically-nonlinear crystal, creates a frequency-multiplied beam which radiates toward the gain-medium. This frequency-multiplied beam has the effect of additional pump-light in the gain-medium, which can amplify fluctuation of the laser.

Through the walk-off between the fundamental (primary laser-beam) wave and frequency-multiplied wave it is possible to screen-out a significant portion of the frequency-multiplied light without influencing the fundamental wave, and thereby, the quality of the resonator. If a screen or shutter is disposed between the optically-nonlinear crystal and the gain-medium in a manner in which the primary laser-beam is not influenced, but in which the frequency-multiplied beam radiating toward the gain-medium is extensively screened-out, the last-described negative effects are avoided.

A further possibility of avoiding supplementary, undesired pumping consists of using a folded resonator. To this end, the optical axis of the resonator between the gain-medium and the optically-nonlinear crystal is redirected by a mirror which is highly reflective for the primary laser-beam, but highly transmissive for the frequency-multiplied beam. In this way, frequency-multiplied light does not find a way into the gain-medium.

In a laser in accordance with the present invention, wherein one of more of the above-described measures are taken to avoid or reduce effects of one or more of the first second and third noise-sources, the fourth noise-source is at least of only secondary importance and may be effectively disregarded. This and other features of lasers in accordance with the present invention is discussed in a detailed description hereinbelow.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
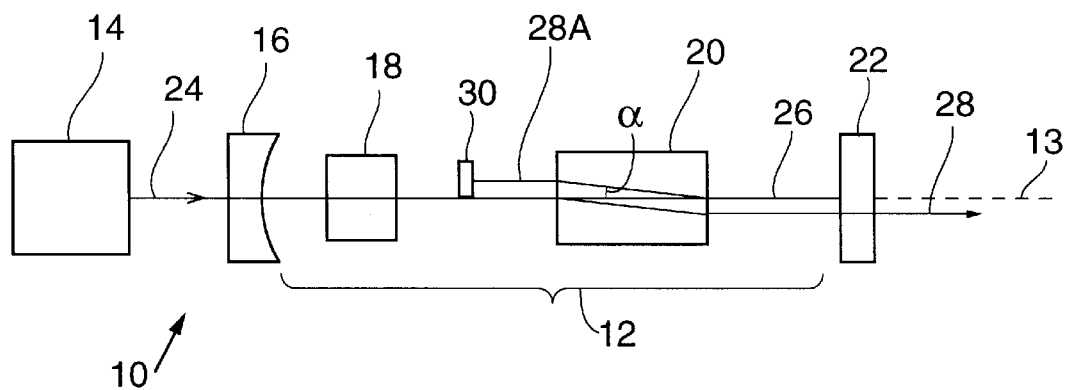
FIG. 1 is a view schematically illustrating one embodiment of a laser in accordance with the present invention having a resonator including an optically-nonlinear crystal and a stop functioning as a separator for a primary laser-beam and a frequency-doubled beam.

Turning now to the drawings, wherein like components are designated by like reference numerals, FIG. 1 depicts an embodiment 10 of a laser in accordance with the present invention. Laser 10 is end-pumped (longitudinally-pumped) by a diode-laser 14 serving as a pump-light source. It should be noted here that principles of the present invention are also applicable to transversely-pumped laser and to a pump-light source other than a diode-laser, such as flashlamp or the like.

Laser 10 has a resonator 12 including first mirror 16 which also serves as an incoupling mirror for pump-light from diode-laser 14; a gain-medium 18; an optically-nonlinear crystal 20; and a second mirror 22, which functions as an outcoupling mirror for the laser. These components are arranged generally along a resonator axis 13. Pump-light 24 from pump-light source 14 reaches gain-medium 18 via incoupling mirror 16. Light 24 excites the gain-medium, resulting in the emission therefrom of a primary laser-beam 26. Incoupling mirror 16 is highly reflective for primary laser-beam 26 and highly transmissive for pump-light 24.

A preferred material for gain-medium 18 is a material selected from the group consisting of Nd:YAG, Nd:YLF, Nd:YVO$_{41}$ Cr:LiSAF and Tu:YAG. Any other suitable materials, however, may be used without departing from the spirit and scope of the present invention. Optically-nonlinear crystal 18, in this embodiment, serves as a frequency-doubler. Principles of the present invention, however, are applicable using a combination of several optically-nonlinear crystals for providing a higher frequency-multiplication of primary laser-beam 26.

A preferred material for optically-nonlinear crystal 20 is critically-phase-matched KNbO$_3$ which has a strong walk-off effect. As noted above, however, other non-linear crystals, such as LiNbO$_3$ or LBO, may be used. In optically-nonlinear crystal 20, primary laser-beam 26 (for example, infrared light) creates a frequency-doubled beam 28 (for example, green light). Outcoupling mirror 22 is highly transparent (highly transmissive) for frequency-doubled beam 28, to allow the beam to exit laser 10, but is highly reflective for primary laser-beam 26.

Beams 26 and 28, in optically-nonlinear crystal 20 include an angle α therebetween, which angle is the same as the walk-off angle of the optically-nonlinear crystal. To clearly depict the walk-off effect, angle α is greatly exaggerated in FIG. 1. On leaving optically-nonlinear crystal 20, frequency-multiplied beam 28 experiences a refraction and proceeds parallel to primary laser-beam 26.

On meeting outcoupling mirror 22, frequency-multiplied beam 28 is almost completely transmitted and exits laser 10. Primary laser-beam 26 is almost completely reflected back on itself, and, on a renewed passage through optically-nonlinear crystal 20, creates a further frequency-multiplied beam 28A which travels in an opposite direction to first frequency-multiplied beam 28.

Because of the walk-off effect, the first frequency-multiplied beam is diverted in a direction (downward in FIG. 1) lateral from primary laser-beam 26. Second frequency-multiplied beam 28A is diverted (upward in FIG. 1) in an opposite direction. Because of this, frequency-multiplied beams 28 and 28A are optimally separated from each other and from primary laser-beam 26.

In order to impede frequency-multiplied beam 28A entering gain-medium 18 and pumping the gain-medium in an undesirable manner, a shutter or screen 30 is provided. Shutter 30 blocks frequency-multiplied beam 28A, but allows primary laser-beam 26 to pass uninfluenced.

Figure 2:
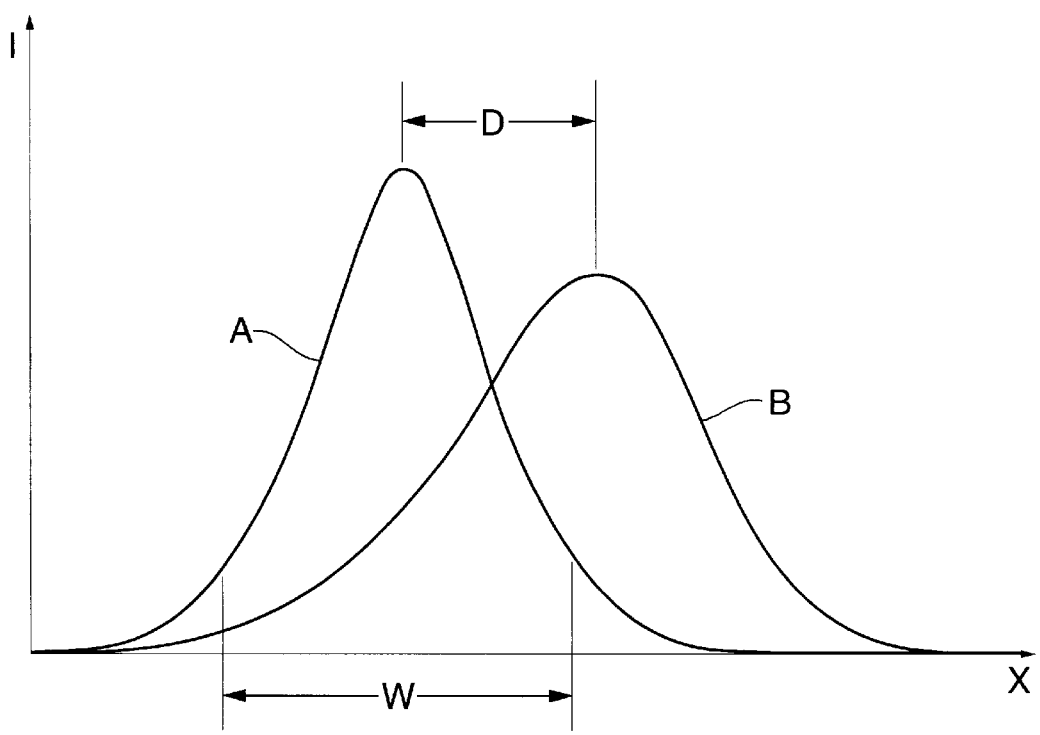
FIG. 2 is a graph schematically illustrating intensity distribution in the primary laser-beam and frequency-doubled beam of FIG. 1 along a cross-section through the beams.

Referring now to FIG. 2, curves A and B schematically depict the intensity profiles of primary laser-beam 26 and frequency-multiplied beam 28 respectively along a cross-section through both beams in a region of resonator 12 between optically-nonlinear crystal 20 and outcoupling mirror 22. Here, intensity (I) is plotted along a spatial axis (x), which is transverse to the propagation direction of the beams. The distance D between the maxima of curves A and B corresponds to about 50% of the diameter W of primary laser-beam 26.

Figure 3:
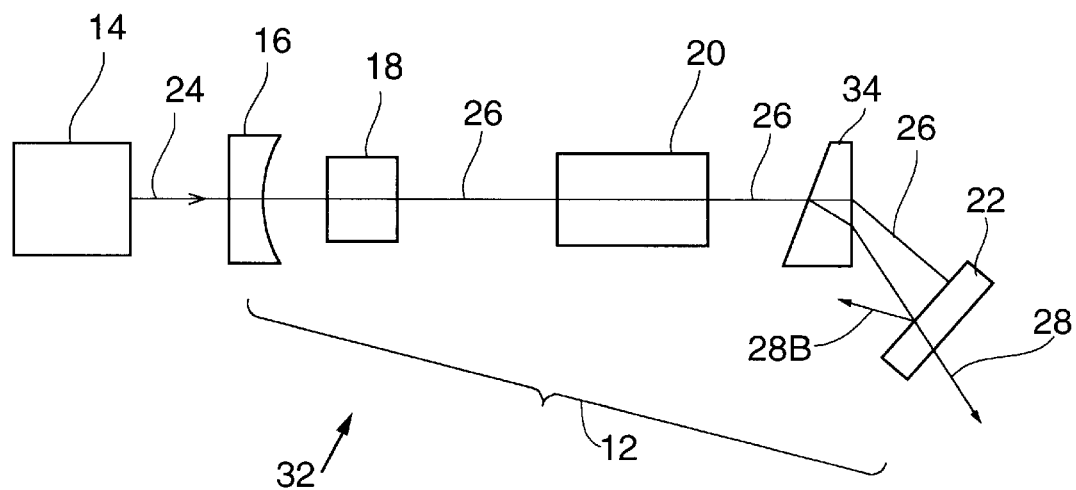
FIG. 3 is a view schematically illustrating another embodiment of a laser in accordance with the present invention having a resonator including an optically-nonlinear crystal and including a dispersive optical element functioning as a separator for a primary laser-beam and a frequency-doubled beam.

Referring now to FIG. 3, a laser 32 in accordance with the present invention is depicted in which the above-described third noise-source is reduced. The arrangement of components 14, 16, and 18, and their function, is the same as for laser 10 of FIG. 1. In laser 40, however, optically-nonlinear crystal 20 can be either optimized for the purpose of frequency-multiplication, and thereby barely separate beams 26 and 28, or can be arranged for optimum spatial separation of the beams 26 and 28 as depicted in FIG. 1. In FIG. 3, for clarity of description of separation principles of laser 32, beams 26 and 28 are depicted in optically-nonlinear crystal 20 as not separated from each other. A prism 34 is arranged between optically-nonlinear crystal 20 and outcoupling mirror 22 to effect beam separation. Primary laser-beam 26 and frequency-multiplied beam 28 are strongly, differentially refracted by prism 34. Outcoupling mirror 22 is arranged such that primary laser-beam 26 is reflected back on itself. Portion 28A of frequency-multiplied beam 28 is reflected from outcoupling mirror 22 at an angle which distances it far from primary laser-beam 26 and frequency-multiplied beam 28. Because of this, effects described above as the third noise-source are impeded.

A laser in accordance with FIG. 3 having an optically non-linear crystal arranged as depicted in FIG. 1 combines effects which serve to reduce the first, second and third noise-sources.

Figure 4:
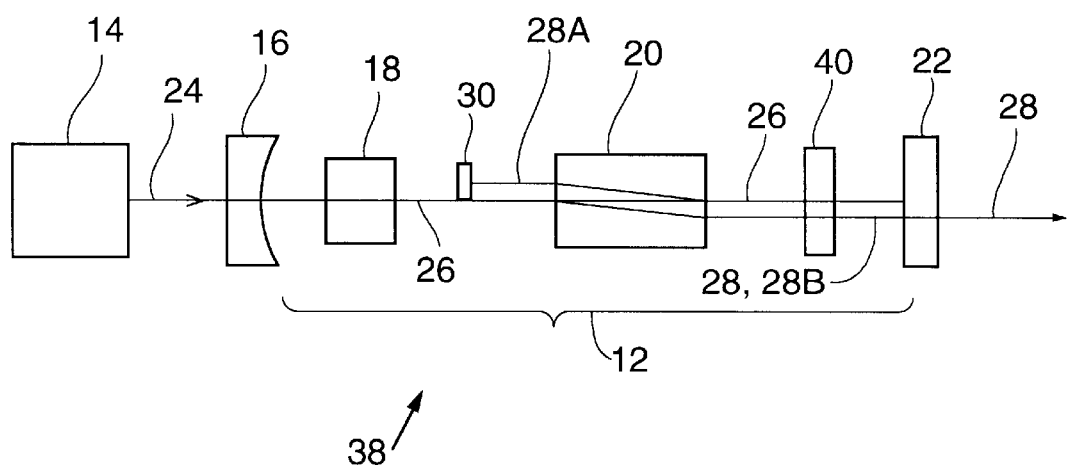
FIG. 4 is a view schematically illustrating yet another embodiment of a laser in accordance with the present invention having a resonator including an optically-nonlinear crystal and including a dispersive polarizer functioning as a separator for a primary laser-beam and a frequency-doubled beam.

In FIG. 4 yet another laser 38 in accordance with the present invention is depicted. Laser 38 is configured similar to laser 10 of FIG. 1, the only difference being that a polarization rotator 40 is arranged between optically-nonlinear crystal 20 and outcoupling mirror 22. Polarization rotator 40 is made from a doubly-refractive, dispersive material, for example, quartz, and serves as a half-wave or full-wave phase-retarder (λ/2-plate or λ-plate) for primary laser-beam 26. This causes primary laser-beam 26, after reflection from outcoupling mirror 22 and a renewed pass through polarization rotator 40, to re-enter optically-nonlinear crystal 20 with its original polarization orientation. Polarization rotator 40 is not effective for portion 28A of frequency-multiplied beam 28, as a λ/2-plate or λ-plate. Portion 28A of frequency-multiplied beam 28 thus re-enters optically-nonlinear crystal 20 in a different polarization orientation from that with which frequency-multiplied beam 28 exited (left) the crystal. Because of this rotation of the polarization orientation, interference between the counter-propagating frequency-multiplied beams (the third noise-source) is impeded.

Reconversion of frequency-multiplied light, in optically-nonlinear crystal 20, into light at the fundamental wavelength, occurs only with a suitable polarization orientation of light entering the crystal. In general, portion 28A of frequency-multiplied beam 28 reflected from outcoupling mirror 20 enters optically-nonlinear crystal 20 as elliptically-polarized light. Only that portion of this elliptically-polarized light which has suitable polarization orientation is effective for reconversion.

In an ideal case, polarization rotator 40 is preferably effective for frequency-multiplied beam 28 as a quarter-wave phase retarder. In such a case, after twice traversing polarization rotator 40, the polarization orientation of portion 28A of frequency-multiplied beam 28 reflected from outcoupling mirror 20 is rotated by 90° with respect to the original polarization orientation and can not be effective at all for reconversion. Reconversion of portion 28A of frequency-multiplied beam 28 reflected from outcoupling mirror 20 contributes to the second noise-source. Accordingly, this contribution is reduced by polarization rotator 40.

Figure 5:
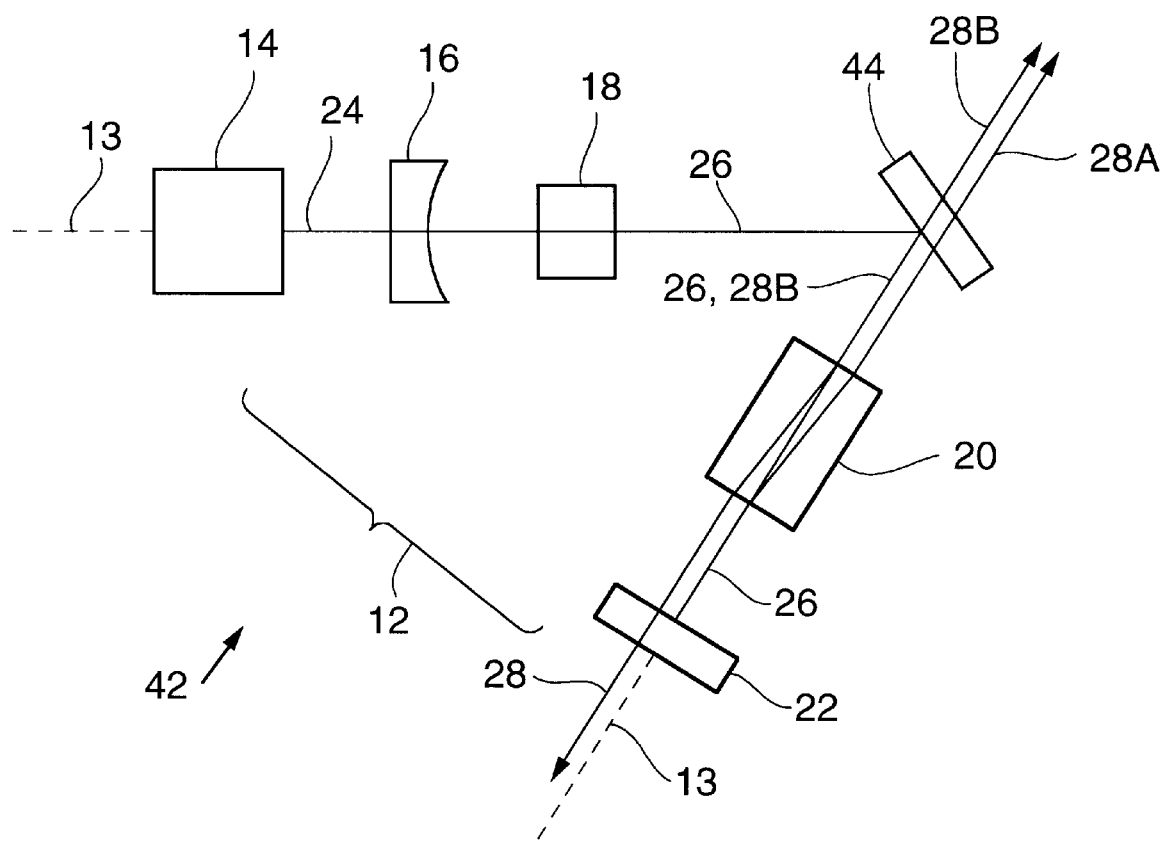
FIG. 5 is a view schematically illustrating still another embodiment of a laser in accordance with the present invention having a resonator folded by a fold-mirror functioning as a separator for a primary laser-beam and two frequency-doubled beams.

Referring now to FIG. 5, still another embodiment 42 of a laser in accordance with the present invention is depicted. Laser 42 is configured almost the same as laser 10 of FIG. 1. Shutter 30, however, is omitted. Instead of the shutter, between gain-medium 18 and optically-nonlinear crystal 20, a mirror 44 is arranged such that optical axis 13 of resonator 12 is "folded". Mirror 44 is coated for high reflectivity of primary laser-beam 26, and high transmission of frequency-multiplied beams 28. Portion 28B of frequency-multiplied beam 28 reflected from outcoupling mirror 22, and frequency-multiplied beam 28A created by primary laser-beam 27 in optically-nonlinear crystal 20 after reflection from outcoupling mirror 22, leave resonator 12 through mirror 44 and, as a result, can not pump gain-medium 18 in an undesired manner.

In one example of a laser 10 configured as depicted in FIG. 1, pump-light source 14 was a diode-laser having an output power of two Watts (2 W) at a wavelength of 808 nm Mirror 16 had a concave radius of curvature of seventy millimeters (70 mm) and outcoupling mirror 22 was a plane mirror. Mirrors 16 and 22 were spaced apart by 60 mm, i.e., resonator 12 had a length of 60 mm. Gain-medium 18 was Nd:YVO$_4$ providing a fundamental wavelength of 1064 nm. Optically-nonlinear crystal 20 was critically-phase-matched KNbO$_3$ having a walk-off angle of seventeen milliradians (17 mrad). Stop 30 was located at a distance of 10 mm from optically-nonlinear crystal 20.

When the exemplary inventive laser was operated with eight longitudinal modes, the laser delivered about 0.25 W of 532 nm light with an RMS noise of less than 0.1%. Similar results were obtained when the laser was operated with a time-average of 12–18 modes. By way of comparison, in the same resonator, using non-critically phase-matched LBO, having no walk off angle, as optically-nonlinear crystal 20, and without any physical stop 30, 532 nm output had an RMS noise of 15% or greater when operated in this multimode range. It is emphasized here that the present invention is not limited to embodiments thereof operating within this multimode range. Comparable results may be obtained in embodiments of the inventive laser running with less than eight or more than fifteen modes.

What is claimed is:

1. A laser comprising:
   a laser resonator terminated by first and second resonator mirrors and having a longitudinal resonator axis;
   a gain-medium and an optically-nonlinear crystal located in said resonator serially disposed along said resonator axis with said optically-nonlinear crystal closest said second mirror;
   an optical-pump providing pump-light for pumping said gain-medium, thereby generating a primary laser-beam said primary laser-beam reciprocally propagating in said resonator along said resonator axis in first and second opposite directions, said primary laser-beam propagating in said first direction passing through said optically-nonlinear crystal, thereby generating a first frequency-multiplied beam and said primary laser-beam propagating in said second direction passing through said optically-nonlinear crystal, thereby generating a second frequency-multiplied beam;
   said second resonator mirror being transmissive for said frequency-multiplied radiation, thereby allowing said first frequency-multiplied beam to exit said resonator as output frequency-multiplied radiation;
   said optically-nonlinear crystal characterized by a walkoff-angle therein between said primary laser-beam passing therethrough and said frequency-multiplied beams generated thereby, and arranged such that said first and second frequency-multiplied beams outside of said optically-nonlinear crystal are laterally separated from said primary laser-beam and from each other by a distance sufficient to reduce interaction therebetween; and
   a component located in said resonator between said optically-nonlinear crystal and said gain-medium and arranged to impede passage of said second frequency-multiplied beam into said gain-medium.

2. The laser of claim 1, wherein said first frequency-multiplied beams and said primary laser-beam outside of said optically-nonlinear crystal are separated by a distance about one half of the diameter of said primary laser-beam.

3. The laser of claim 1, wherein said component is a physical stop arranged to allow passage of said primary-laser-beam and impede passage of said second frequency-multiplied beam.

4. The laser of claim 1, wherein said component is an optical-componenthighly reflective for said primary laser-beam and highly transmissive for the wavelength of said frequency-multiplied beams, said optical-component being arranged such that said primary laser-beam and said second frequency-multiplied beam are incident thereon in such a way that said resonator-axis is folded thereby and any portion of said second frequency-multiplied beam transmitted therethrough does not enter said gain-medium.

5. The laser of claim 1, wherein said primary laser-beam and said first frequency-multiplied beam are polarized and a polarization rotator is located on said resonator axis between said optically-nonlinear crystal and said second mirror, said polarization rotator configured such that the polarization orientation of said primary laser-beam in both directions of propagation within said optically non-linear crystal is the same, while any portion of said first frequency-multiplied beam reflected from said second mirror into said optically-nonlinear crystal, on entering said optically-nonlinear crystal has a different polarization orientation from that of said first frequency-multiplied beam on exiting said optically-nonlinear crystal.

6. The laser of claim 5, wherein said polarization rotator is arranged as one of a half-wave rotator and a full-wave rotator for the wavelength of said primary laser-beam.

7. The laser of claim 6, wherein said polarization rotator is arranged as a quarter-wave rotator for the wavelength of said frequency multiplied-beams.

8. The laser of claim 1, wherein said gain-medium is selected from the group of gain media consisting of Nd:YAG, Nd:YLF, Nd:YVO$_4$, Cr:LiSAF and Tu:YAG.

9. The laser of claim 1, wherein said optically-non linear crystal is a crystal of a material selected from the group consisting of KNbO$_3$, LiNbO$_3$, BBO and LBO.

10. The laser of claim 1, wherein said gain-medium is and Nd:YVO$_4$ said optically-non linear crystal is a KNbO$_3$ crystal.

11. The laser of claim 10, wherein said said primary laser beam has a wavelength of about 1064 nanometers said frequency-multiplied beams are frequency-doubled beams having a wavelength of about 532 nanometers.

12. The laser of claim 1, wherein said first mirror is highly transmissive for said pump light and said pump light is delivered longitudinally to said gain-medium through said first mirror.

13. The laser of claim 12, wherein said pump-light source is a diode-laser.

14. A laser comprising:
a laser resonator terminated by first and second resonator mirrors and having a resonator axis;
a gain-medium and an optically-nonlinear crystal located in said resonator serially disposed along said resonator axis with said optically-nonlinear crystal closest said second mirror;
an optical-pump for pumping said gain-medium, thereby generating a primary laser-beam, said primary laser-beam reciprocally propagating in said resonator along said resonator axis in first and second opposite directions, said primary laser-beam propagating in said first direction passing through said optically-nonlinear crystal, thereby generating a first frequency-multiplied beam and said primary laser-beam propagating in said second direction passing through said optically-nonlinear crystal, thereby generating a second frequency-multiplied beam;
said second resonator mirror being transmissive for said frequency-multiplied radiation, thereby allowing said first frequency-multiplied beam to exit said resonator as output frequency-multiplied radiation; and
a dispersive optical-component located in said resonator on said resonator ax is between said optically-nonlinear crystal and said second mirror and arranged to cause angular divergence of said first frequency-multiplied beam from said primary laser-beam sufficient that any portion of said first frequency-multiplied beam reflected from said second mirror is not reflected into said optically-nonlinear crystal.

15. The laser of claim 14, wherein said optically-nonlinear crystal is characterized by a walkoff-angle therein between said primary laser-beam passing therethrough and the frequency-multiplied beams generated thereby, and arranged such that said second frequency-multiplied beam outside of said optically-nonlinear crystal is laterally separated from said primary laser-beam.

16. The laser of claim 15 further including a physical stop arranged to allow passage of said primary-laser-beam and impede passage of said second frequency-multiplied beam into said gain-medium.

17. A laser comprising:
a laser resonator terminated by first and second resonator mirrors and having a longitudinal resonator axis;
a gain-medium and an optically-nonlinear crystal located in said resonator serially disposed along said closest said second mirror;
an optical-pump for pumping said gain-medium, thereby generating a primary laser-beam said primary laser-beam reciprocally propagating in said resonator along said resonator axis in first and second opposite directions, said primary laser-beam propagating in said first direction passing through said optically-nonlinear crystal, thereby generating a first frequency-multiplied beam and said primary laser-beam propagating in said second direction passing through said optically-nonlinear crystal, thereby generating a second frequency-multiplied beam;
said second resonator mirror being transmissive for said frequency-multiplied radiation, thereby allowing said first frequency-multiplied beam to exit said resonator as output frequency-multiplied radiation;
said optically-nonlinear crystal characterized by a walkoff-angle therein between said primary laser-beam passing therethrough and the frequency-multiplied beams generated thereby, and arranged such that said first and second frequency-multiplied beams outside of said optically-nonlinear crystal are laterally separated from said primary laser-beam and from each other by a distance sufficient to reduce interaction therebetween;
a physical stop located in said resonator between said optically-nonlinear crystal and said gain-medium and arranged to allow passage of said primary laser-beam while impeding impede passage of said second frequency-multiplied beam into said gain-medium; and
wherein said primary laser-beam and said first frequency-multiplied beam are polarized, and a polarization rotator is located on said resonator axis between said optically-nonlinear crystal and said second mirror, said polarization rotator configured such that the polarization orientation of said primary laser-beam in said optically-nonlinear crystal in both directions of propagation is the same, while any portion of said first frequency-multiplied beam reflected from said second mirror into said optically-nonlinear crystal, on entering said optically-nonlinear crystal has a different polarization orientation from that of said first frequency-multiplied beam on exiting said optically-nonlinear crystal.

18. A laser comprising:
a laser resonator terminated by first and second resonator mirrors and having a resonator axis folded by a third mirror located therebetween;
a gain-medium and an optically-nonlinear crystal located in said resonator serially disposed along said resonator axis with said gain-medium located between said first mirror and said third mirror said optically-nonlinear crystal located between said third mirror and said second mirror;
an optical-pump for pumping said gain-medium, thereby generating a primary laser-beam said primary laser-beam reciprocally propagating in said resonator along said resonator axis in first and second opposite directions, said primary laser-beam propagating in said first direction passing through said optically-nonlinear crystal, thereby generating a first frequency-multiplied beam and said primary laser-beam propagating in said second direction passing through said optically-nonlinear crystal, thereby generating a second frequency-multiplied beam;
said second resonator mirror being transmissive for said frequency-multiplied radiation, thereby allowing said first frequency-multiplied beam to exit said resonator as output frequency-multiplied radiation;
said optically-nonlinear crystal characterized by a walkoff-angle therein between said primary laser-beam passing therethrough and said frequency-multiplied beams generated thereby, and arranged such that said first and second frequency-multiplied beams outside of said optically-nonlinear crystal are laterally separated from said primary laser-beam and from each other by a distance sufficient to reduce interaction therebetween; and
said third mirror being highly transmissive for the wavelength of said frequency multiplied beams and being arranged to transmit out of said resonator said second frequency-multiplied beam and a portion of said first frequency-multiplied beam reflected from said second mirror.

19. The laser of claim 18 wherein said primary laser-beam and said first frequency-multiplied beam are polarized and a polarization rotator is located on said resonator axis between said optically-nonlinear crystal and said second mirror, said polarization rotator configured such that the polarization orientation of said primary laser-beam in both directions of propagation is the same, while any portion of said first frequency-multiplied beam reflected from said second mirror into said optically-nonlinear crystal, on entering said optically-nonlinear crystal has a different polarization orientation from that of said first frequency-multiplied beam on exiting said optically-nonlinear crystal.

20. A laser, comprising:
- a pump-light source, first and second mirrors defining a laser resonator having a longitudinal axis, a gain-medium for providing a primary laser-beam at a fundamental wavelength, and an optically-nonlinear crystal;
- said first mirror, said gain-medium, said optically-nonlinear crystal and the second mirror are serially arranged on the longitudinal axis of said laser resonator;
- said optically-nonlinear crystal causing said primary laser-beam to generate a frequency-multiplied laser-beam, and said second mirror serving as an outcoupling-mirror delivering frequency-multiplied radiation from said resonator; and
- said optically-nonlinear crystal arranged to cause lateral separation of the frequency-multiplied laser-beam from the primary laser-beam.

21. A laser comprising:
- a laser resonator terminated by first and second resonator mirrors and having a resonator axis;
- a gain-medium and an optically-nonlinear crystal located in said resonator serially disposed along said resonator axis with said optically-nonlinear crystal closest said second mirror;
- an optical-pump providing pump-light for pumping said gain-medium, thereby generating a primary laser-beam of having a fundamental wavelength, said primary laser-beam reciprocally propagating in said resonator along said resonator axis in first and second opposite directions, said primary laser-beam propagating in said first direction passing through said optically-nonlinear crystal, thereby being converted to a first frequency-multiplied beam and said primary laser-beam propagating in said second direction passing through said optically-nonlinear crystal thereby, being converted to a second frequency-multiplied beam;
- said second resonator mirror being transmissive for said frequency-multiplied radiation, thereby allowing said first frequency-multiplied beam to exit said resonator as output frequency-multiplied radiation; and
- wherein said optically-nonlinear crystal is arranged cooperative with at least one other component located in the resonator to reduce one or more of (a) interaction between said first and second frequency-multiplied beams; (b) interaction between said primary laser-beam and radiation of the fundamental wavelength created by reconversion in said optically non-linear crystal of a portion of said first frequency-multiplied beam reflected from said second mirror; (c) interaction between said first frequency-modulated beam and a portion of said first frequency-modulated beam reflected from said second mirror; and (d) supplementary pumping of said gain-medium by said second frequency-multiplied beam.

\* \* \* \* \*